(12) United States Patent
Lin

(10) Patent No.: US 11,855,926 B2
(45) Date of Patent: Dec. 26, 2023

(54) METHOD FOR DETERMINING TOTAL NUMBER OF BITS OF FEEDBACK RESPONSE INFORMATION AND RELATED PRODUCT

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 128 days.

(21) Appl. No.: 17/535,901

(22) Filed: Nov. 26, 2021

(65) Prior Publication Data

US 2022/0085957 A1 Mar. 17, 2022

Related U.S. Application Data

(63) Continuation of application No. 16/619,431, filed as application No. PCT/CN2018/085678 on May 4, 2018, now Pat. No. 11,233,621.

(30) Foreign Application Priority Data

Aug. 9, 2017 (WO) ................ PCT/CN2017/096656
Apr. 3, 2018 (WO) ................ PCT/CN2018/081785

(51) Int. Cl.
*H04L 5/00* (2006.01)
*H04L 1/1812* (2023.01)
(Continued)

(52) U.S. Cl.
CPC .......... *H04L 5/0055* (2013.01); *H04L 1/1812* (2013.01); *H04L 1/1854* (2013.01);
(Continued)

(58) Field of Classification Search
CPC ... H04L 1/1812; H04L 1/1854; H04L 1/1864; H04L 5/0055; H04L 5/0094; H04W 28/04; H04W 72/04
See application file for complete search history.

(56) References Cited

U.S. PATENT DOCUMENTS 8,176,377 B2 * 5/2012 Parolari ................ H04L 1/1614
714/749
8,493,873 B2 7/2013 Malladi
(Continued)

FOREIGN PATENT DOCUMENTS

CN 101547077 A 9/2009
CN 101771502 A 7/2010
(Continued)

OTHER PUBLICATIONS

International Search Report in the international application No. PCT/CN2018/085678, dated Jul. 18, 2018; filed in parent U.S. Appl. No. 16/619,431.
(Continued)

*Primary Examiner* — Eric Nowlin
(74) *Attorney, Agent, or Firm* — Ladas & Parry, LLP

(57) ABSTRACT

A method for determining the length of feedback response information and a related product. The method comprises the following steps: a terminal receives configuration signaling sent by a network side device, the configuration signaling comprising: indicating the maximum transmission delay of feedback response information; the terminal dynamically determines a hybrid automatic repeat request feedback time sequence; the terminal determines the total number of bits of a feedback response message to be transmitted according to the maximum transmission delay; the terminal sends the feedback response message to be transmitted with the total number of bits to the network side device. The technical solution provided by the present
(Continued)

invention has the advantage of supporting the multiplex transmission of feedback response information in one transmission time unit in a new radio system.

12 Claims, 8 Drawing Sheets

(51) Int. Cl.
 *H04W 28/04* (2009.01)
 *H04L 1/1829* (2023.01)
 *H04W 72/04* (2023.01)

(52) U.S. Cl.
 CPC .......... *H04L 1/1864* (2013.01); *H04L 5/0094* (2013.01); *H04W 28/04* (2013.01); *H04W 72/04* (2013.01)

(56) References Cited

U.S. PATENT DOCUMENTS

| | | | |
|---|---|---|---|
| 8,670,396 B2 | 3/2014 | Luo | |
| 9,184,869 B2 | 11/2015 | Han | |
| 9,585,131 B2 | 2/2017 | Gao et al. | |
| 9,716,569 B2 | 7/2017 | Larsson et al. | |
| 9,762,356 B2 | 9/2017 | Rudolf et al. | |
| 9,893,846 B2 | 2/2018 | Yu et al. | |
| 10,225,050 B2* | 3/2019 | Guan | H04L 1/18 |
| 10,469,234 B2 | 11/2019 | Yang et al. | |
| 10,595,166 B2 | 3/2020 | Yin et al. | |
| 10,715,280 B2 | 7/2020 | Hu et al. | |
| 10,736,085 B2 | 8/2020 | Yan et al. | |
| 10,785,757 B2 | 9/2020 | Yan et al. | |
| 10,848,291 B2 | 11/2020 | Yang et al. | |
| 10,873,437 B2 | 12/2020 | Yin et al. | |
| 10,887,071 B2* | 1/2021 | Peng | H04W 72/21 |
| 10,985,893 B2* | 4/2021 | Yoshimoto | H04L 27/26025 |
| 10,999,864 B2 | 5/2021 | Zhang et al. | |
| 11,088,809 B2 | 8/2021 | Yang et al. | |
| 11,219,049 B2* | 1/2022 | Wang | H04L 1/1825 |
| 11,233,621 B2* | 1/2022 | Lin | H04W 72/12 |
| 11,258,544 B2* | 2/2022 | Wang | H04L 1/1896 |
| 11,356,987 B2* | 6/2022 | Li | H04L 1/1887 |
| 11,601,250 B2* | 3/2023 | Peng | H04L 1/1854 |
| 2010/0011273 A1* | 1/2010 | Parolari | H04L 1/1664 714/E11.113 |
| 2011/0228731 A1 | 9/2011 | Luo | |
| 2013/0044667 A1 | 2/2013 | Han | |
| 2014/0362832 A1 | 12/2014 | Rudolf et al. | |
| 2015/0173066 A1 | 6/2015 | Gao et al. | |
| 2015/0333878 A1 | 11/2015 | Yu et al. | |
| 2016/0248551 A1 | 8/2016 | Larsson et al. | |
| 2017/0331595 A1 | 11/2017 | Rudolf et al. | |
| 2017/0331596 A1* | 11/2017 | Guan | H04W 72/21 |
| 2018/0020335 A1 | 1/2018 | Yin et al. | |
| 2018/0048451 A1 | 2/2018 | Yin et al. | |
| 2018/0077719 A1 | 3/2018 | Nory et al. | |
| 2018/0145815 A1 | 5/2018 | Takeda et al. | |
| 2018/0159665 A1 | 6/2018 | Yang et al. | |
| 2018/0159675 A1 | 6/2018 | Yang et al. | |
| 2018/0167935 A1 | 6/2018 | Yan et al. | |
| 2018/0310290 A1 | 10/2018 | Shimezawa | |
| 2019/0104515 A1* | 4/2019 | Li | H04L 1/1887 |
| 2019/0116616 A1 | 4/2019 | Si et al. | |
| 2019/0260552 A1 | 8/2019 | Parkvall et al. | |
| 2019/0273581 A1 | 9/2019 | Zhu et al. | |
| 2019/0296863 A1 | 9/2019 | Hu et al. | |
| 2019/0306878 A1 | 10/2019 | Zhang et al. | |
| 2019/0363840 A1* | 11/2019 | Wang | H04L 1/1896 |
| 2019/0373601 A1 | 12/2019 | Yan et al. | |
| 2020/0044812 A1 | 2/2020 | Yang et al. | |
| 2020/0084789 A1* | 3/2020 | Wang | H04L 1/1825 |
| 2020/0099475 A1 | 3/2020 | Amuru et al. | |
| 2020/0127794 A1 | 4/2020 | Lin | |
| 2020/0145140 A1 | 5/2020 | Lee et al. | |
| 2020/0177352 A1* | 6/2020 | Peng | H04L 1/1861 |
| 2020/0178285 A1 | 6/2020 | Sun et al. | |
| 2020/0205192 A1 | 6/2020 | Zhang et al. | |
| 2020/0295882 A1* | 9/2020 | Wang | H04L 1/1864 |
| 2020/0313807 A1 | 10/2020 | Salem | |
| 2020/0389278 A1 | 12/2020 | Yang et al. | |
| 2020/0403737 A1 | 12/2020 | Yeo et al. | |
| 2021/0076374 A1 | 3/2021 | Yan et al. | |
| 2021/0111852 A1* | 4/2021 | Peng | H04L 1/1861 |
| 2021/0176014 A1 | 6/2021 | Parkvall et al. | |
| 2021/0184816 A1 | 6/2021 | Yang et al. | |
| 2021/0218539 A1* | 7/2021 | Hu | H04L 5/0094 |
| 2021/0273750 A1* | 9/2021 | Ma | H04L 1/1854 |
| 2022/0021505 A1* | 1/2022 | Ma | H04L 5/0044 |
| 2022/0085957 A1* | 3/2022 | Lin | H04L 1/1854 |
| 2022/0278807 A1* | 9/2022 | Zhang | H04L 1/1861 |
| 2022/0377796 A1* | 11/2022 | Jung | H04L 1/1864 |
| 2023/0189244 A1* | 6/2023 | Xu | H04W 72/12 370/329 |
| 2023/0208567 A1* | 6/2023 | Hu | H04L 1/1893 370/329 |
| 2023/0283441 A1* | 9/2023 | Peng | H04L 1/1812 370/329 |

FOREIGN PATENT DOCUMENTS

| | | | | |
|---|---|---|---|---|
| CN | 101958775 A | 1/2011 | | |
| CN | 102098146 A | 6/2011 | | |
| CN | 102158326 A | 8/2011 | | |
| CN | 102237982 A | 11/2011 | | |
| CN | 102647261 A | 8/2012 | | |
| CN | 102687414 A | 9/2012 | | |
| CN | 102870388 A | 1/2013 | | |
| CN | 103580825 A | 2/2014 | | |
| CN | 104254995 A | 12/2014 | | |
| CN | 104380645 A | 2/2015 | | |
| CN | 103580825 B | 5/2017 | | |
| CN | 106899396 A | 6/2017 | | |
| CN | 109391352 A | 2/2019 | | |
| CN | 110351018 A | 10/2019 | | |
| CN | 111130711 B | 11/2021 | | |
| CN | 114938701 A * | 8/2022 | | H04L 1/1812 |
| EP | 2882128 A1 | 6/2015 | | |
| EP | 2882128 A4 | 8/2015 | | |
| EP | 2882128 B1 | 3/2018 | | |
| EP | 3598709 A1 | 1/2020 | | |
| EP | 3598709 A4 | 4/2020 | | |
| EP | 3937538 A1 * | 1/2022 | | H04L 1/1607 |
| JP | 5992102 B2 | 9/2016 | | |
| JP | 2020-506574 A | 2/2020 | | |
| KR | 20150041018 A | 4/2015 | | |
| KR | 101749199 B1 | 7/2017 | | |
| RU | 2514089 C2 | 4/2014 | | |
| TW | 200727626 A | 7/2007 | | |
| TW | 201412072 A | 3/2014 | | |
| WO | 2007084065 A2 | 7/2007 | | |
| WO | 2014000221 A1 | 1/2014 | | |
| WO | 2014019541 A1 | 2/2014 | | |
| WO | 2016208726 A1 | 12/2016 | | |
| WO | 2017024860 A1 | 2/2017 | | |
| WO | 2017078782 A1 | 5/2017 | | |
| WO | 2017131374 A1 | 8/2017 | | |
| WO | 2019029317 A1 | 2/2019 | | |
| WO | 2019075693 A1 | 4/2019 | | |
| WO | 2020197195 A1 | 10/2020 | | |
| WO | WO-2021090298 A1 * | 5/2021 | | H04L 1/1812 |

OTHER PUBLICATIONS

Written Opinion of the International Search Authority in the international application No. PCT/CN2018/085678, dated Jul. 18, 2018; filed in parent U.S. Appl. No. 16/619,431.

International Search Report in the international application No. PCT/CN2017/096656, dated Apr. 16, 2018; filed in parent U.S. Appl. No. 16/619,431.

(56) References Cited

OTHER PUBLICATIONS

Written Opinion of the International Search Authority in the international application No. PCT/CN2017/096656, dated Apr. 16, 2018; filed in parent U.S. Appl. No. 16/619,431.
International Search Report in the international application No. PCT/CN2018/081785, dated Jun. 27, 2018; filed in parent U.S. Appl. No. 16/619,431.
Written Opinion of the International Search Authority in the international application No. PCT/CN2018/081785, dated Jun. 27, 2018; filed in parent U.S. Appl. No. 16/619,431.
Ericsson, 3GPP TSG RAN1 WG1 Meeting #91, R1-1721013, On HARQ Management, Dec. 1, 2017 (Dec. 1, 2017), entire document including sections 1-4; filed in parent U.S. Appl. No. 16/619,431.
CATT., 3GPP TSG RAN WG1 Meeting #87, R1-1611394, NR UL Control Channel Structure, Nov. 18, 2016 (Nov. 18, 2016), entire document; filed in parent U.S. Appl. No. 16/819,431.
Guangdong Oppo Mobile Telecom., 3GPP TSG RAN WG1 meeting #89, R1-1707726, On Symbol-Level Time-Domain Resource Allocation, May 19, 2017 (May 19, 2017), entire document.
Ericsson, 3GPP TSG RAN WG1 #89, R1-1709102, On Fixed HARQ Codebook Design, May 19, 2017 (May 19, 2017), entire document; filed in parent U.S. Appl. No. 16/619,431.
CATT: "HARQ and scheduling timing design for LTE sTTI", 3GPP Draft; R1-1707446, 3rd Generation Partnership Project (3GPP), Mobile Competence Centre ; 650, Route Des Lucioles; F-06921 Sophia-Antipolis Cedex; France, vol. RAN WG1, No. Hangzhou; May 15, 2017-May 19, 2017, May 14, 2017 (May 14, 2017), XP051272655, Retrieved from the Internet: URL: http://www.3gpp.org/ftp/Meetings_3GPP_SYNC/RAN1/Docs/[ retrieved on May 14, 2017], entire document; filed in parent U.S. Appl. No. 16/619,431.
Ericsson: "On HARQ Codebook", 3GPP Draft; R1-1711510, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 17, 2017 (Jun. 17, 2017), XP051305638, Retrieved from the Internet: URL: http://ww.3gpp. org/ftp/tsg_ran/WG1_RL1/TSGR1_AH/NR_AH_1706/Docs/ [ retrieved on—Jun. 17, 2017], entire document; filed in parent U.S. Appl. No. 16/619,431.
Supplementary European Search Report in the European application No. 18843899.8, dated Jun. 9, 2020, entire document; filed in parent U.S. Appl. No. 16/619,431.
Nokia, Alcatel-Lucent Shanghai Bell, "On HARQ feedback determination", 3GPP TSG RAN WG1 NR Ad-Hoc #2 R1-1710999, Qingdao, P.R. China, Jun. 27-30, 2017, entire document; filed in parent U.S. Appl. No. 16/619,431.
Huawei, HiSilicon, "On HARQ-ACK multiplexing and/or bundling", 3GPP TSG RAN WG1 NR Ad Hoc Meeting R1-1710462, Qingdao, China, Jun. 27- 30, 2017, entire document; filed in parent U.S. Appl. No. 16/619,431.
Samsung, "HARQ-ACK codebook determination", 3GPP TSG RAN WG1 NR Ad-Hoc#2, R1-1710729, Qingdao, P.R. China, Jun. 27-30, 2017, entire document; filed in parent U.S. Appl. No. 16/619,431.
Supplementary European Search Report in the European application No. 18845146.8, dated Jun. 9, 2020, entire document; filed in parent U.S. Appl. No. 16/619,431.
First Office Action of the Chinese application No. 201911342791.5, dated Nov. 2, 2020, entire document. filed in parent U.S. Appl. No. 16/619,431.
First Office Action of the U.S. Appl. No. 16/619,431, dated Jan. 12, 2021, entire document, filed in parent U.S. Appl. No. 16/619,431.
First Office Action of the European application No. 18845148.8, dated Feb. 3, 2021, entire document, filed in parent U.S. Appl. No. 16/619,431.
First Office Action of the Chilean application No. 201903914, dated Mar. 16, 2021, entire document, filed in parent U.S. Appl. No. 16/619,431.
Office Action of the Indian application No. 201917049701, dated Mar. 23, 2021, entire document, filed in parent U.S. Appl. No. 16/619,431.
First Office Action of the European application No. 18843899.8, dated Feb. 3, 2021, entire document, filed in parent U.S. Appl. No. 16/619,431.
First Office Action of the Chinese application No. 201911348552.0, dated May 8, 2021, entire document, filed in parent U.S. Appl. No. 16/619,431.
First Office Action of the Canadian application No. 3066673, dated May 14, 2021, entire document, filed in parent U.S. Appl. No. 16/619,431.
First Office Action of the Russian application No. 2019144638, dated Jul. 5, 2021, entire document, filed in parent U.S. Appl. No. 16/619,431.
NTT Docomo, Inc., HARQ/Scheduling timing for shortened processing time for 1ms TTI, May 15, 2017, 3GPP TSG RAN WG Meeting #89. Tdoc: R1-1708408 (Year: 2017), entire document.
Nokia et al., On HARQ feedback determination, May 15, 2017, 3GPP TSG RAN WG1 Meeting #89, Tdoc: R1-1708527 (Year: 2017), entire document.
Huawei et al., HARQ processing time, Jun. 27, 2017, 3GPP TSG RAN WG1 NR Ad-Hoc Meeting, Tdoc: R1-1709964 (Year: 2017), entire document.
Ericsson, On UE processing time and scheduling complexity, Jun. 27, 2017, 3GPP TSG RAN WG1 NR Ad-Hoc#2, Tdoc: R1-1711367 (Year: 2017), entire document.
Ericsson, On Minimum Processing Time and Number of HARQ Processes in NR, Jun. 27, 2017, 3GPP TSG RAN WG1 NR Ad-Hoc #2, Tdoc: R1-1711511 (Year: 2017), entire document.
Pre-Interview Communication of the U.S. Appl. No. 16/619,431, dated Jun. 24, 2021, entire document.
Notice of Allowance of the U.S. Appl. No. 16/619,431, dated Aug. 27, 2021, entire document.
First Office Action of the Indonesian application No. P00202001699, dated Sep. 14, 2022.
First Office Action of the Australian application No. 2018314361, dated Sep. 30, 2022.
First Office Action of the Israeli application No. 271334, dated Jul. 27, 2022.
First Office Action of the Taiwanese application No. 107127887, dated Apr. 25, 2022.
3GPP TS 36.213 V10.7.0, 3rd Generation Partnership Project; Technical Specification Group Radio Access Network; Evolved Universal Terrestrial Radio Access (E-UTRA); Physical layer procedures (Release 10), Technical Specification, (Sep. 2012), entire document.
Huawei, HiSilicon. "HARQ feedback timing for NR", 3GPP TSG RAN WG1 NR Ad Hoc Meeting R1-1709970, Qingdao, China, Jun. 27-30, 2017, entire document.
3GPP TS 36.212 V11.0.0, 3rd Generation Partnership Project; Technical Specification Group Radio Access Network; Evolved Universal Terrestrial Radio Access (E-UTRA); Multiplexing and channel coding (Release 11), Technical Specification, (Sep. 2012), entire document.
European Search Report in the European application No. 21195034.0, dated Nov. 23, 2021.
First Office Action of the Japanese application No. 2019-570022, dated Feb. 4, 2022.
First Office Action of the Taiwanese application No. 107127783, dated Dec. 14, 2021.
Fujitsu; Discussion on HARQ-ACK codebook; 3GPP TSG RAN WG1 NR Ad-Hoc#2 Qingdao, P.R. China Jun. 27-30, 2017, R1-1710242, entire document.
First Office Action and search report of the counterpart Chinese application No. 201880033480.8, dated Jul. 26, 2023, 18 pages with English translation.
First Office Action and search report of the counterpart Chinese application No. 201880032494.8, dated Aug. 11, 2023, 17 pages with English translation.
Notification Prior to Refusal of the counterpart Israeli application No. 271334, dated Aug. 13, 2023, 2 pages with English translation.

* cited by examiner

METHOD FOR DETERMINING TOTAL NUMBER OF BITS OF FEEDBACK RESPONSE INFORMATION AND RELATED PRODUCT

CROSS-REFERENCE TO RELATED APPLICATIONS

The application is a continuation of U.S. application Ser. No. 16/619,431 filed on Dec. 4, 2019, which is a national phase application of International Patent Application No. PCT/CN2018/085678 filed on May 4, 2018, and claims priority to PCT Application No. PCT/CN2017/096656 filed on Aug. 9, 2017 and entitled "Method for Determining Feedback Response Information and Related Product" and to PCT Application No. PCT/2018/081785 filed on Apr. 3, 2018 and entitled "Method for Determining Length of Feedback Response Information and Related Product". The contents of these applications are hereby incorporated by reference in their entireties.

TECHNICAL FIELD

The disclosure relates to the field of communication technologies, and more particularly to a method for determining a total number of bits of feedback response information and related product.

BACKGROUND

Hybrid Automatic Repeat Request (HARQ) integrates storage, retransmission request and merging demodulation. A receiving party, in case of a failure in decoding, stores received data and requests a sending party to retransmit data, and the receiving party merges retransmitted data and the previously received data for decoding.

A New Radio (NR) system supports dynamic indication of HARQ timing. In a technical solution of HARQ timing, a length (i.e., the number of bits) of an Acknowledgement (ACK)/Negative Acknowledgement (NACK) fed back within a transmission time unit (for example, a time slot) cannot be determined, so that an related NR system cannot support multiplexing transmission of an ACK/NACK.

SUMMARY

Implementations of the disclosure provide a method for determining a total number of bits of feedback response information and related product, which may implement multiplexing transmission of an ACK/NACK in an NR system.

According to a first aspect, the implementations of the disclosure provide a method for determining a total number of bits of feedback response information, which may include the following operations.

A terminal receives configuration signaling transmitted by a network device, here, the configuration signaling includes an indication about a maximum transmission delay for feedback response information.

The terminal determines a total number of bits of feedback response information to be transmitted according to the maximum transmission delay and a minimum transmission delay.

In an implementation, after the operation that the terminal determines the total number of bits of the feedback response information to be transmitted according to the maximum transmission delay and the minimum transmission delay, the method may further include the following operation.

The terminal transmits to the network device the feedback response information to be transmitted with the total number of bits.

In an implementation, a time unit, which is used by the terminal to transmit to the network device the feedback response information to be transmitted with the total number of bits, may be determined by the terminal according to dynamically determined HARQ feedback timing.

In an implementation, the operation that the terminal determines the total number of bits of the feedback response information to be transmitted according to the maximum transmission delay and the minimum transmission delay may include the following operation.

The terminal determines the total number of bits of the feedback response information to be transmitted according to a difference between the maximum transmission delay and the minimum transmission delay.

In an implementation, the operation that the terminal determines the total number of bits of the feedback response information to be transmitted according to the maximum transmission delay and the minimum transmission delay may include the following operation.

The total number of bits $N=C*(T_{max}-T_{min})$.

Here, $T_{max}$ may be the maximum transmission delay, $T_{min}$ may be a nonnegative integer less than $T_{max}$, and C may be a positive integer.

In an implementation, $T_{min}$ may be the minimum transmission delay for transmission of the feedback response information by the terminal, or $T_{min}$ may be a parameter configured by the network device.

In an implementation, C may be a maximum number of bits of feedback response information corresponding to a Physical Downlink Shared Channel (PDSCH), or C may be a set constant, or C may be a parameter configured by the network device.

In an implementation, the maximum number of bits of the feedback response information corresponding to the PDSCH may be: a maximum number of Transport Blocks (TBs) carried in the PDSCH; or a maximum number of Code Block (CB) groups carried in the PDSCH.

In an implementation, the operation that the terminal transmits to the network device the feedback response information to be transmitted with the total number of bits may include the following operations.

The terminal transmits the feedback response information on which a joint encoding has been performed; or the terminal transmits the feedback response information through a physical channel.

According to a second aspect, implementations of the disclosure provide a device for determining a total number of bits of feedback response information, which may include a processing unit and a transceiver unit connected with the processing unit.

The transceiver unit may be configured to receive configuration signaling transmitted by a network device, here, the configuration signaling includes an indication about a maximum transmission delay for feedback response information.

The processing unit may be configured to determine a total number of bits of feedback response information to be transmitted according to the maximum transmission delay and a minimum transmission delay.

In an implementation, the transceiver unit may further be configured to transmit, by a terminal, to the network device the feedback response information to be transmitted with the total number of bits.

In an implementation, a time unit used by the terminal to transmit to the network device the feedback response information to be transmitted with the total number of bits may be determined by the terminal according to dynamically determined HARQ feedback timing.

In an implementation, the processing unit may specifically be configured to determine the total number of bits of the feedback response information to be transmitted according to a difference between the maximum transmission delay and the minimum transmission delay.

In an implementation, the processing unit may specifically be configured to determine the total number of bits of the feedback response information to be transmitted according to the maximum transmission delay and the minimum transmission delay, the total number of bits $N=C^*(T_{max}-T_{min})$.

Here, $T_{max}$ may be the maximum transmission delay, $T_{min}$ may be a nonnegative integer less than $T_{max}$, and C may be a positive integer.

In an implementation, $T_{min}$ may be the minimum transmission delay for transmission of the feedback response information by the terminal, or $T_{min}$ may be a parameter configured by the network device.

In an implementation, C may be a maximum number of bits of feedback response information corresponding to a PDSCH, or C may be a set constant, or C may be a parameter configured by the network device.

In an implementation, the maximum number of bits of the feedback response information corresponding to the PDSCH may be: a maximum number of TBs carried in the PDSCH; or a maximum number of CB groups carried in the PDSCH.

In an implementation, the transceiver unit may specifically be configured to transmit the feedback response information on which a joint encoding has been performed. Or the transceiver unit may specifically be configured to transmit the feedback response information through a physical channel.

According to a third aspect, implementations of the disclosure provide a method for determining a total number of bits of feedback response information, which may include the following operations.

A network device transmits configuration signaling to a terminal, here, the configuration signaling includes an indication about a maximum transmission delay for feedback response information.

The network device determines a total number of bits of feedback response information to be transmitted according to the maximum transmission delay and a minimum transmission delay.

In an implementation, after the operation that the network device determines the total number of bits of the feedback response information to be transmitted according to the maximum transmission delay and the minimum transmission delay, the method may further include the following operation.

The network device receives from the terminal the feedback response information to be transmitted with the total number of bits.

In an implementation, a time unit for the feedback response information to be transmitted with the total number of bits, which information is received by the network device, may be determined by the terminal according to dynamically determined HARQ feedback timing.

In an implementation, the operation that the network device determines the total number of bits of the feedback response information to be transmitted according to the maximum transmission delay and the minimum transmission delay may include the following operation.

The network device determines the total number of bits of the feedback response information to be transmitted according to a difference between the maximum transmission delay and the minimum transmission delay.

In an implementation, the operation that the network device determines the total number of bits of the feedback response information to be transmitted according to the maximum transmission delay and the minimum transmission delay may include the following operation.

The total number of bits $N=C^*(T_{max}-T_{min})$.

Here, $T_{max}$ may be the maximum transmission delay, $T_{min}$ may be a nonnegative integer less than $T_{max}$, and C may be a positive integer.

In an implementation, $T_{min}$ may be the minimum transmission delay for feedback response information transmission of the terminal. Or $T_{min}$ may be a parameter configured by the network device.

In an implementation, C may be a maximum number of bits of feedback response information corresponding to a PDSCH. Or C may be a set constant. Or C may be a parameter configured by the network device.

In an implementation, the maximum number of bits of the feedback response information corresponding to the PDSCH may be: a maximum number of TBs carried in the PDSCH; or a maximum number of CB groups carried in the PDSCH.

In an implementation, the operation that the network device receives from the terminal the feedback response information to be transmitted with the total number of bits may include the following operations.

The network device receives from the terminal the feedback response information on which a joint encoding has been performed.

Or the network device receives the feedback response information that is transmitted by the terminal through a physical channel.

According to a fourth aspect, implementations of the disclosure provide a device for determining a total number of bits of feedback response information, which may include a processing unit and a transceiver unit connected with the processing unit.

The transceiver unit may be configured to transmit configuration signaling to a terminal, here, the configuration signaling includes an indication about a maximum transmission delay for feedback response information.

The processing unit may be configured to determine a total number of bits of feedback response information to be transmitted according to the maximum transmission delay and a minimum transmission delay.

According to a fifth aspect, implementations of the disclosure provide a terminal, which may include one or more processors, a memory, a transceiver and one or more programs. The one or more programs may be stored in the memory and configured to be executed by the one or more processors, and the programs may include instructions configured to execute the operations in the method provided in the first aspect.

According to a sixth aspect, implementations of the disclosure provide a computer-readable storage medium, which may store a computer program for electronic data exchange, here, the computer program enables a computer to execute the method provided in the first aspect.

According to a seventh aspect, implementations of the disclosure provide a computer program product, which may include a non-transitory computer-readable storage medium storing a computer program, the computer program is operable to enable a computer to execute the method provided in the first aspect.

According to an eighth aspect, implementations of the disclosure provide a network device, which may include one or more processors, a memory, a transceiver and one or more programs. The one or more programs may be stored in the memory and configured to be executed by the one or more processors, and the programs may include instructions configured to execute the operations in the method provided in the third aspect.

According to a ninth aspect, implementations of the disclosure provide a computer-readable storage medium, which may store a computer program for electronic data exchange, here, the computer program enables a computer to execute the method provided in the third aspect According to a tenth aspect, implementations of the disclosure provide a computer program product, which may include a non-transitory computer-readable storage medium storing a computer program, the computer program is operable to enable a computer to execute the method provided in the third aspect From the above, in the implementations of the disclosure, the terminal receives a maximum transmission delay transmitted by a base station, calculates a length of the feedback response information to be transmitted according to the maximum transmission delay and transmits to the base station the feedback response information with the length, so that multiplexing transmission of an ACK/NACK in a transmission time unit may be supported by an NR system, and the advantage of supporting multiplexing transmission of the feedback response information in the NR system is achieved.

BRIEF DESCRIPTION OF DRAWINGS

The drawings used for descriptions about the implementations or related arts will be simply introduced below.

DETAILED DESCRIPTION

The technical solutions in the implementations of the disclosure will be described below in combination with the drawings.

Figure 1:
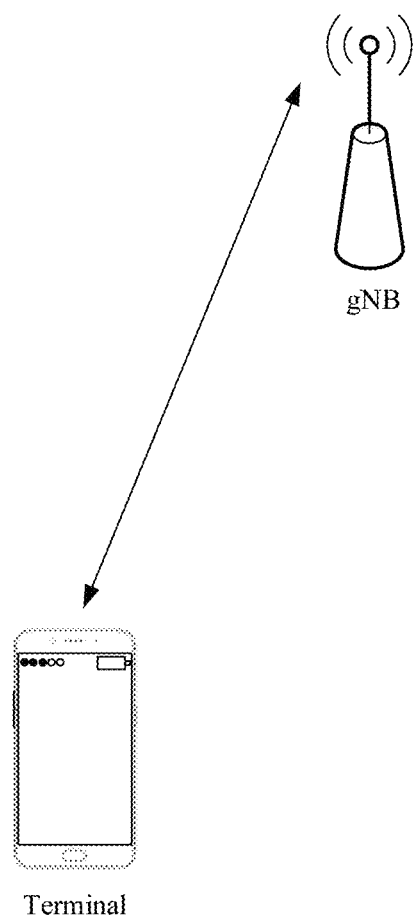
FIG. 1 is a structure diagram of an exemplary communication system.

Referring to FIG. 1, FIG. 1 is a possible network architecture of an exemplary communication system according to an implementation of the disclosure. The exemplary communication system may be a 5th-Generation (5G) NR communication system, and specifically includes a network device and a terminal. When the terminal accesses a mobile communication network provided by the network device, the terminal may establish a communication connection with the network device through a radio link. Such a communication connection manner may be a single-connection manner or a dual-connection manner or a multi-connection manner. When the communication connection manner is the single-connection manner, the network device may be a Long Term Evolution (LTE) base station or an NR Node B (NR-NB) (also called a gNB). When the communication manner is the dual-connection manner (which may specifically be implemented by a Carrier Aggregation (CA) technology or implemented by multiple network devices) and the terminal is connected with multiple network devices, the multiple network devices may include a Master Cell Group (MCG) and a Secondary Cell Group (SCG), data backhaul is performed between the cell groups through backhaul links, the MCG may be an NR base station and each SCGs may be an NR base station.

In the implementations of the disclosure, terms "network" and "system" are usually used alternately and meanings of the terms may be understood by those skilled in the art. A terminal involved in the implementations of the disclosure may include a handheld device with wireless communication functions, a vehicle-mounted device, a wearable device, a computing device or other processing devices connected to a wireless modem, as well as various forms of User Equipment (UE), Mobile Station (MS), terminal device and the like. For convenient description, the devices mentioned above are collectively referred to as terminals.

Figure 2:
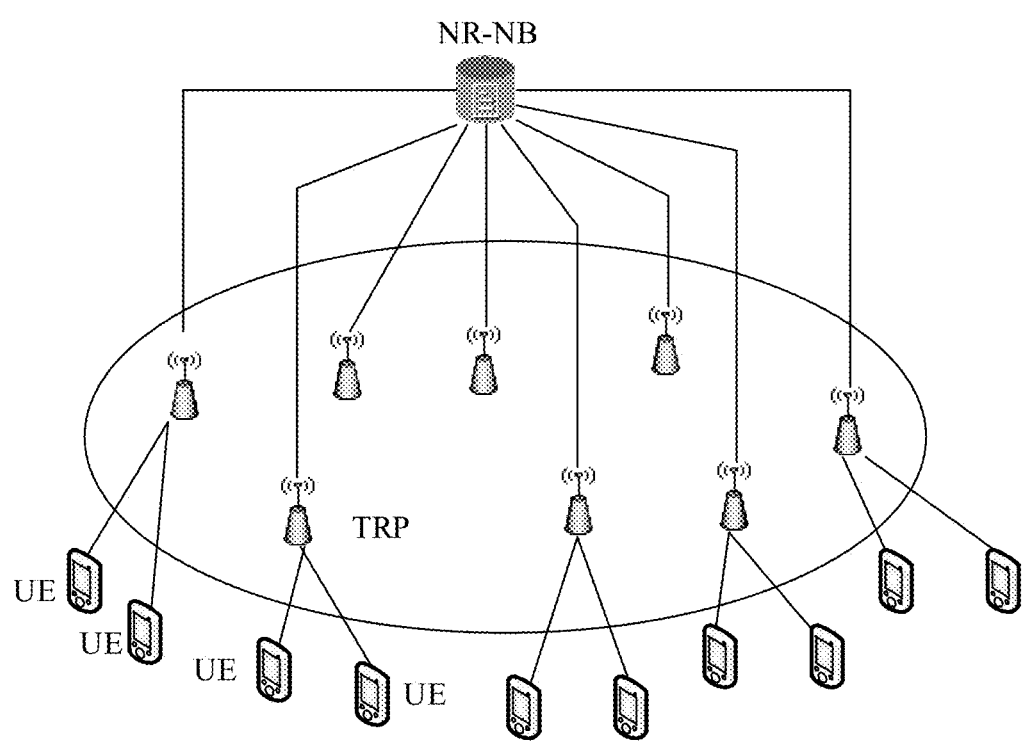
FIG. 2 is a structure diagram of an exemplary NR communication system.
Figure 2A:
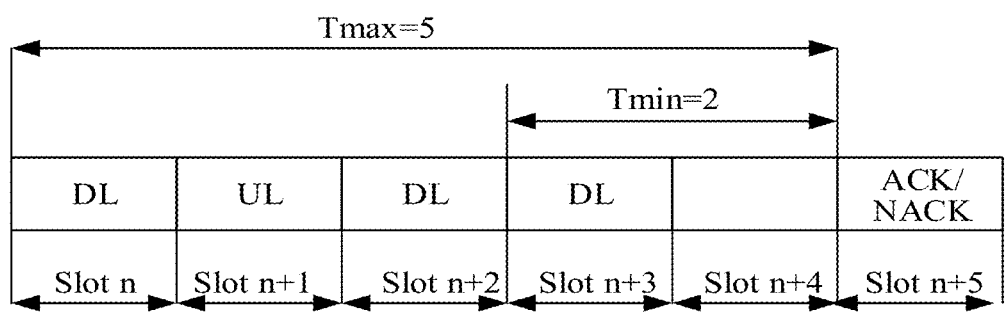
FIG. 2A is a diagram of exemplary transmission time units.

Referring to FIG. 2, FIG. 2 is a structure diagram of a 5G NR network. As illustrated in FIG. 2, there may be one or more Transmission Reception Points (TRPs) under an NR-NB, and there may be one or more terminals within a range of the one or more TRPs. In an NR system illustrated in FIG. 2, for Downlink (DL) data, a terminal needs to feed back to the gNB through HARQ whether the DL data is successfully received. That is, the terminal needs to feed back a HARQ ACK/NACK to the gNB. In the NR system, HARQ timing for ACK/NACK feedback information for data (mainly the DL data) may be dynamically indicated by the gNB, in the following, a transmission time unit is, for example, a slot. Referring to FIG. 2A, FIG. 2A is a diagram of transmission time units for HARQ timing in an NR system. Here, there may be made such a hypothesis that the HARQ timing is indicated in a slot n. As illustrated in FIG. 2A, there is made such a hypothesis that the HARQ timing may be five slots, and in the five slots, the slot n is used to carry DL data for DL transmission, the slot n+1 is used to carry Uplink (UL) data for UL transmission, the slot n+2 is used to carry DL data, the slot n+3 is used to carry DL data, the slot n+4 is empty and the slot n+5 is a slot through which the terminal feeds back an ACK/NACK to the gNB. Since both the slot n+2 and the slot n+3 are used to carry the DL data, the ACK/NACK corresponding to the slot n+2 and the ACK/NACK corresponding to the slot n+3 are also needed to be fed back. For example, if the gNB dynamically indicates that HARQ timing for the ACK/NACK corresponding to the slot n+2 is three slots and HARQ timing for the ACK/NACK corresponding to the slot n+3 is two slots, then for the slot n+5, there are ACK/NACKs for three slots, that is, multiplexing transmission of the ACKs/NACKs for the three slots are performed in the slot n+5. In the NR system illustrated in FIG. 2, the terminal cannot implement multiplexing transmission of the ACKs/NACKs for the three slots, in the slot n+5.

Figure 3:
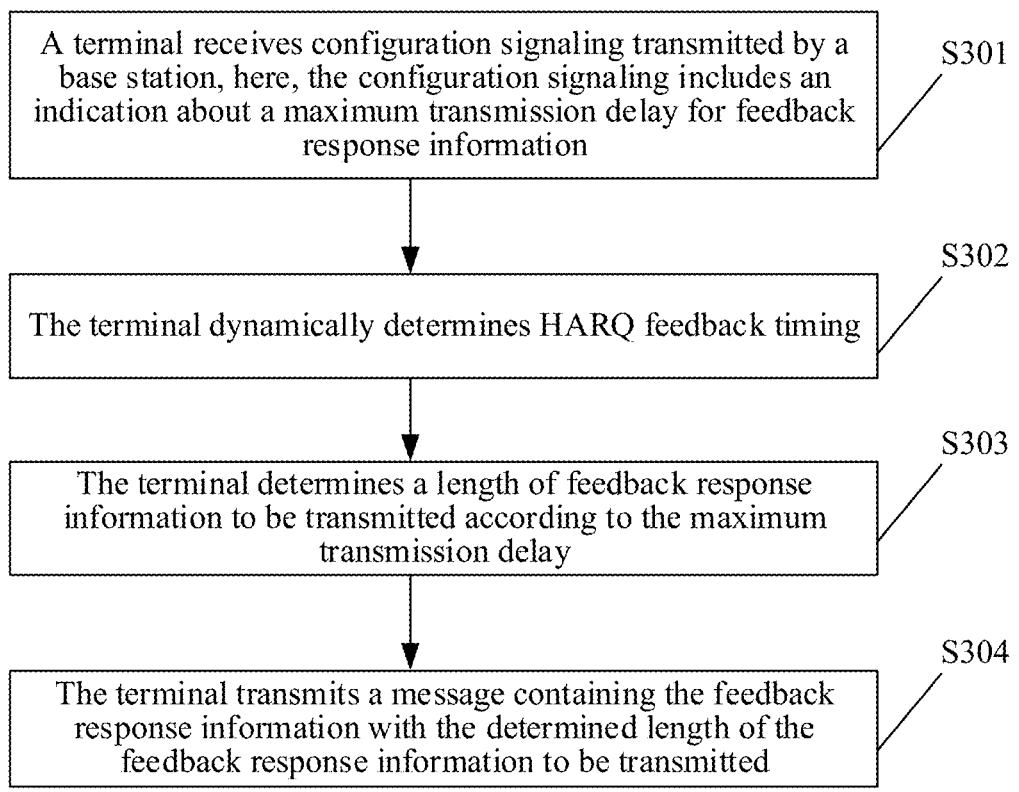
FIG. 3 is a flowchart of a method for determining a length of feedback response information according to an implementation of the disclosure.

Referring to FIG. 3, FIG. 3 illustrates a method for determining a length of feedback response information according to an implementation of the disclosure. The method is performed by a terminal. As illustrated in FIG. 3, the method includes the following operations.

In S301, the terminal receives configuration signaling transmitted by a network device (for example, a base station). The configuration signaling may include an indication about a maximum transmission delay for feedback response information.

The configuration signaling in S301 may be DL control signaling for scheduling a PDSCH transmission. Specifically, the maximum transmission delay may be indicated in a DL grant for scheduling the PDSCH. Here, a transmission time unit is, for example, a slot. There is made such a hypothesis that a first transmission time unit in which the configuration signaling is received is a slot n, and the maximum transmission delay may be the number of slots. Specifically, the maximum transmission delay may be, for example, k1, and then k1 is indicated in a DL grant of the slot n for scheduling the PDSCH.

In S302, the terminal dynamically determines HARQ feedback timing.

An implementation method for S302 may specifically be as follows. The terminal parses the configuration signaling to obtain the maximum transmission delay, a transmission time unit obtained after delaying the maximum transmission delay from the first transmission time unit in which the configuration signaling is received is namely a transmission time unit for HARQ feedback response information. Here, the transmission time unit is also, for example, a slot. If the configuration signaling is carried in a slot n for transmission and the maximum transmission delay corresponding to the configuration signaling is k1, the determined HARQ feedback timing is k1, and the transmission time unit for the HARQ feedback response information may be slot n+k1.

In S303, the terminal determines a length (i.e., a total number of bits) of feedback response information to be transmitted according to the maximum transmission delay.

In an implementation, the terminal determines the total number of bits of the feedback response information according to the maximum transmission delay and a minimum transmission delay.

In an implementation, the terminal determines the total number of bits of the feedback response information to be transmitted according to a difference between the maximum transmission delay and the minimum transmission delay.

In an implementation, the terminal determines the total number of bits of the feedback response information to be transmitted according to the maximum transmission delay, the minimum transmission delay and $M_{non-DL}$, here, $M_{non-DL}$ is a value less than the maximum transmission delay.

In an implementation, the terminal determines the total number of bits of the feedback response information to be transmitted according to a value obtained by subtracting the minimum transmission delay and $M_{non-DL}$ from the maximum transmission delay, here, $M_{non-DL}$ is a value less than the maximum transmission delay.

In S304, the terminal transmits a message containing the feedback response information with the determined length of the feedback response information to be transmitted.

An implementation method for S304 may specifically be as follows.

The terminal transmits the feedback response information on which a joint encoding has been performed.

Or the terminal transmits the feedback response information through a physical channel.

According to the technical solution provided by the implementation illustrated in FIG. 3, a base station, when scheduling a PDSCH transmission, indicates the maximum transmission delay in a DL grant of the first transmission time unit for scheduling the PDSCH, and the terminal, after receiving the first transmission time unit, acquires the maximum transmission delay, calculates the length of the HARQ feedback response information according to the maximum transmission delay, and transmits the HARQ feedback response information with the length to the base station, so that multiplexing transmission of an ACK/NACK in a transmission time unit is supported in an NR system.

A technical effect achieved by the implementation will be described below with an example. The transmission time unit illustrated in FIG. 2A is transmitted in the NR illustrated in FIG. 2. Herein, there is made such a hypothesis that each transmission time unit includes two TBs. If the terminal successfully receives the slot n and the slot n+2 and the terminal does not receive the slot n+3, for example, the terminal does not successfully receive the data in the slot n+3, a response corresponding to the slot n+3 is not fed back, so that the terminal does not carry, in the slot n+5, HARQ feedback response information corresponding to the slot n+3, and the feedback response information carried by the terminal in the slot n+5 may be 1111. The base station may not recognize, according to the 1111, that the terminal does not receive the slot n+2 or the slot n+3, and thus the base station may not accurately obtain the HARQ feedback response information of the terminal for subsequent operations, for example, data retransmission cannot be performed according to the HARQ feedback response information. According to the technical solution illustrated in FIG. 3, the terminal receives, in the slot n, configuration signaling, here, the configuration signaling includes the maximum transmission delay which is 5 slots, the terminal determines according to the maximum transmission delay that the total number of bits of the HARQ feedback response information is 6 (the specific method for determining the total number of bits may refer to the following descriptions and will not be elaborated herein), and the terminal transmits, in the slot n+5, the 6-bit HARQ feedback response information and may specifically transmit 111100. The base station may know according to allocation of slots for DL data that the slot n and the slot n+2 are successfully transmitted and the slot n+3 is failed to be transmitted, and thereby achieving the advantage that multiplexing transmission of an ACK/NACK in a transmission time unit is supported in the NR system.

In an implementation, an implementation method for S303 may specifically be as follows.

The length, i.e., the total number of bits N, of the feedback response information is calculated according to the following formula (1).

$$N = C * (T_{max} - T_{max}) \quad (1)$$

Here, C may be a positive integer, $T_{max}$ may be the maximum transmission delay, and $T_{min}$ may be a nonnegative integer not greater than $T_{max}$.

Specifically, $T_{min}$ may be the minimum transmission delay for transmission of the feedback response information by the terminal. Of course, $T_{min}$ may also be a parameter configured by the network device, and the parameter may be a fixed value. Of course, during a practical application, a value of $T_{min}$ may also be carried in the configuration signaling.

C may be a maximum number of bits of feedback response information corresponding to a PDSCH. Or C may be a set constant (i.e., a value specified in a protocol or a value predetermined by a manufacturer). Or C may be a parameter configured by the network device.

The maximum number of bits of the feedback response information corresponding to the PDSCH may specifically be: a maximum number of TBs carried in the PDSCH; or a maximum number of CB groups carried in the PDSCH.

Figure 3A:
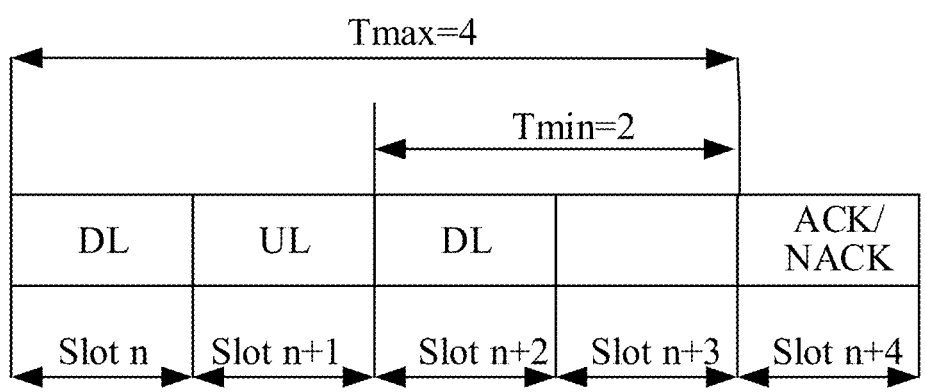
FIG. 3A is a diagram of transmission time units according to an implementation of the disclosure.

For example, the maximum number of the TBs carried in a slot for a PDSCH may be 2 (the number is only for exemplary description and a specific value of the number is not limited in the disclosure), this does not mean that each slot includes two TBs. In a practical application scenario, the slot may include one TB or no TB (for example, the slot n+4 illustrated in FIG. 2A). The number of the CB groups carried in a slot for a PDSCH may be 4 (the number is only for exemplary description and a specific value of the number is not limited in the disclosure), and similarly, this also does not mean that each slot includes four CB groups. A method for determining a value of N will be described below with an exemplary. Referring to FIG. 3A, the configuration signaling may be carried in the slot n, the maximum transmission delay in the configuration signaling is 4 slots, and the minimum transmission delay in the configuration signaling is 2 slots. There is made such a hypothesis that a total number of basic units for the feedback response information in each slot is two. Here, a basic unit for the feedback response information is, for example, a TB. Of course, during a practical application, the basic unit for the feedback response information may also be a CB group, here, the CB group includes at least one CB. The value is determined to be 4 (bits) according to N=2*(4−2)=4 calculated by using the formula (1).

The above technical solution does not distinguish whether the feedback response information between $T_{max}$ and $T_{min}$ is needed to be fed back to the base station. As illustrated in FIG. 3A, the slot n+1 may be used to carry UL data, and for the slot n+1, no feedback response information is needed to be transmitted to the base station. In the technical solution, the feedback response information corresponding to the slot n+1 may be filled with a specific numerical value (for example, 1 or 0), and the base station only needs to identify the feedback response information corresponding to the slot n and the slot n+2, and may discard or not process the feedback response information corresponding to the slot n+1.

In an implementation, the implementation method for S303 may specifically be as follows.

The length, i.e., the total number of bits N, of the feedback response information is calculated according to the following formula (2).

$$N=C*(T_{max}-T_{min}-M_{non-DL}) \quad (2)$$

Here, $T_{min}$ and $M_{non-DL}$ may be each a nonnegative integer and N is a nonnegative value, and meanings of C and $T_{max}$ may refer to the descriptions in the formula (1).

In an implementation, $M_{non-DL}$ may specifically be: the number of all first-type time units between a transmission time unit $Y-T_{max}$ and a transmission time unit $Y-T_{min}$, here, a transmission time unit Y is a transmission time unit for transmission of the feedback response information.

The first-type time unit may specifically include, but not limited to, one or any combination of: a UL time unit, a time unit in which no physical shared channel is transmitted by the terminal and a time unit in which no DL control signaling is monitored by the terminal.

In the implementation of the disclosure, in addition to determining the length of the feedback response information by the formula (1) and the formula (2), another implementation manner may also be adopted to determine the length of the feedback response information according to the maximum transmission delay and the minimum transmission delay, or another implementation manner is adopted to determine the length of the feedback response information according to the maximum transmission delay, the minimum transmission delay and $M_{non-DL}$. For simplicity, elaborations are omitted herein.

A method for determining a value of N will be described below with an example. Referring to FIG. 3A, the configuration signaling may be carried in the slot n, the maximum transmission delay in the configuration signaling is four slots, the minimum transmission delay in the configuration signaling is 2 slots, and a UL time unit between a slot Y−4 and a slot Y−1 is the slot n+1, so $M_{non-DL}$=1. There is made such a hypothesis that the total number of the basic units for the feedback response information in each slot is 2. Herein, a basic unit for the feedback response information is, for example, a TB. Of course, during a practical application, the basic unit for the feedback response information may also be a CB group, here, the CB group includes at least one CB. The value is determined to be 2 (bits) according to N=2*(4−2−1)=2 calculated by using the formula (2).

The above technical solution distinguishes whether the feedback response information between $T_{max}$ and $T_{min}$, is needed to be fed back to the base station. As illustrated in FIG. 3A, the slot n+1 may be used carry UL data, and for the slot n+1, no feedback response information is needed to be transmitted to the base station. According to the technical solution, no information is fed back, for the slot n+1, in the feedback response information.

Figure 3B:
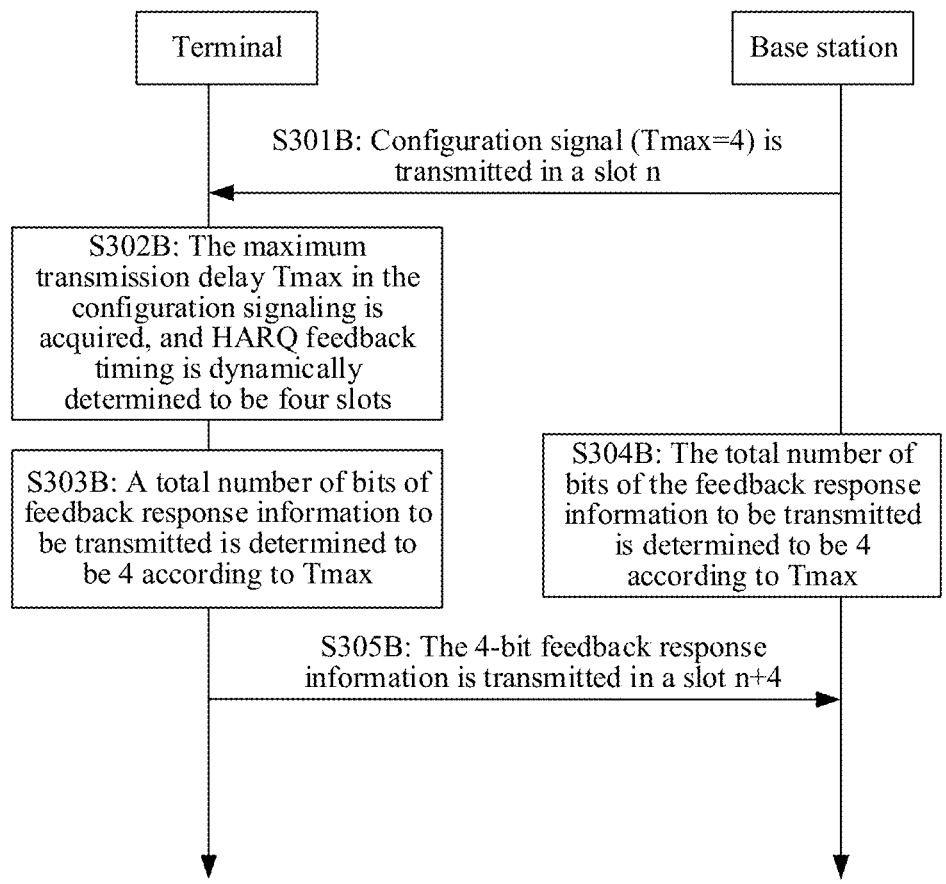
FIG. 3B is a flowchart of a method for determining a length of feedback response information according to another implementation of the disclosure.

Referring to FIG. 3B, FIG. 3B illustrates a method for determining a length of feedback response information according to a specific implementation mode of the disclosure. A network device in the implementation is, for example, a base station. The method is performed between a terminal and base station illustrated in FIG. 1. Transmission time units between the terminal and the base station are illustrated in FIG. 3A. As illustrated in FIG. 3B, the method includes the following operations.

In S301B, the base station transmits configuration signaling to the terminal in a slot n, here, the configuration signaling includes an indication about a maximum transmission delay (which is 4 slots) for feedback response information.

In S302B, the terminal acquires the maximum transmission delay in the configuration signaling and dynamically determines HARQ feedback timing to be four slots.

In S303B, the terminal determines a total number of bits N=2*(4−2−1)=2 of feedback response information to be transmitted according to the formula (2).

In S304B, the base station determines the total number of bits N=2*(4−2−1)=2 of the feedback response information to be transmitted according to the formula (2).

In S305B, the terminal transmits the 2-bit feedback response information to the base station in a slot n+4. According to the technical solution of the disclosure, the terminal calculates the total number of bits of the feedback response information and then transmits the feedback response information with the total number of bits to the base station, thereby achieving, in the slot n+4, multiplexing transmission of feedback response information for the slot n and slot n+2.

Figure 3C:
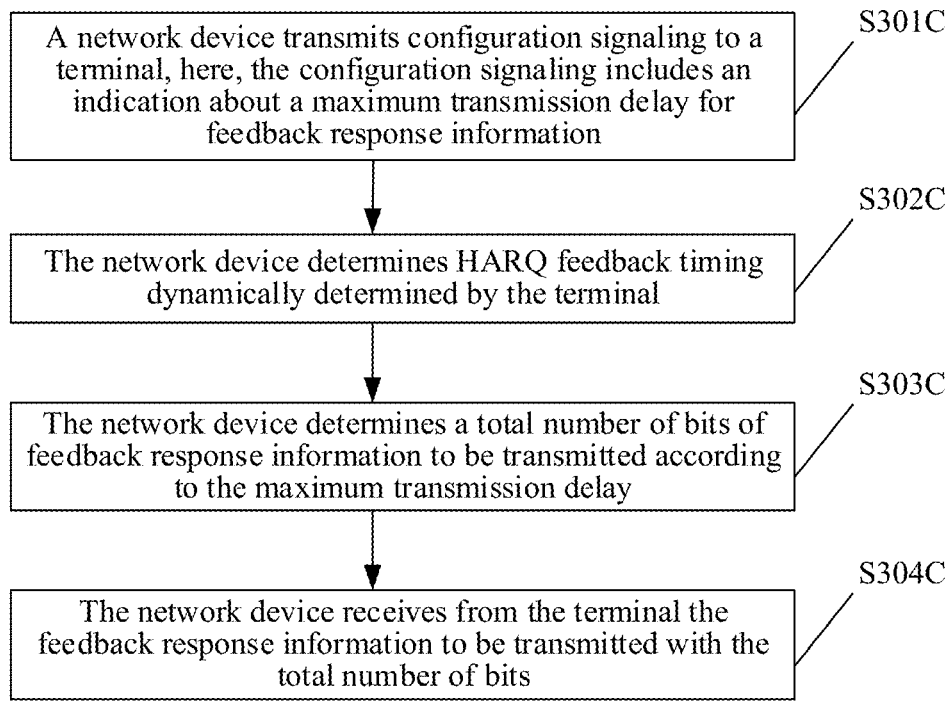
FIG. 3C is a flowchart of another method for determining a length of feedback response information according to yet another implementation of the disclosure.

Referring to FIG. 3C, FIG. 3C illustrates another method for determining a length of feedback response information. The method is performed by a network device, and the network device may be a base station illustrated in FIG. 1 or FIG. 2. As illustrated in FIG. 3C, the method includes the following operations.

In S301C, the network device transmits configuration signaling to a terminal, here, the configuration signaling includes an indication about a maximum transmission delay for feedback response information.

In S302C, the network device determines HARQ feedback timing dynamically determined by that the terminal.

In S303C, the network device determines a total number of bits of feedback response information to be transmitted according to the maximum transmission delay.

In an implementation, the network device determines the total number of bits of the feedback response information to be transmitted according to the maximum transmission delay and a minimum transmission delay.

In an implementation, the network device determines the total number of bits of the feedback response information to be transmitted according to a difference between the maximum transmission delay and the minimum transmission delay.

In an implementation, the network device determines the total number of bits of the feedback response information to be transmitted according to the maximum transmission delay, the minimum transmission delay and $M_{non-DL}$, here, $M_{non-DL}$ is a value less than the maximum transmission delay.

In an implementation, the network device determines the total number of bits of the feedback response information to be transmitted according to a value obtained by subtracting the minimum transmission delay and $M_{non-DL}$ from the maximum transmission delay, here, $M_{non-DL}$ is a value less than the maximum transmission delay.

In S304C, the network device receives from the terminal the feedback response information to be transmitted with the total number of bits.

The method of the implementation illustrated in FIG. 3C supports implementation of the method of the implementation illustrated in FIG. 3, and thus has the advantage that multiplexing transmission of an ACK/NACK in a transmission time unit is supported in an NR system.

In an optional solution, the total number of bits N=C*$(T_{max}-T_{min})$.

Here, $T_{max}$ is the maximum transmission delay, $T_{min}$ is a nonnegative integer less than $T_{max}$, and C is a positive integer.

In another optional solution, the total number of bits N=C*$(T_{max}-T_{min}-M_{non-DL})$.

Here, $T_{max}$ is the maximum transmission delay, $T_{min}$ and $M_{non-DL}$ are each a nonnegative integer less than $T_{max}$, and C is a positive integer.

In an implementation, in the optional solution or the another optional solution, $T_{min}$ is the maximum transmission delay for transmission of feedback response information by the terminal. Or $T_{min}$ is a parameter configured by the network device.

In an implementation, in the optional solution or the another optional solution, C is a maximum number of bits of feedback response information corresponding to a PDSCH. Or C is a set constant. Or C is a parameter configured by the network device.

In an implementation, in the another optional solution, $M_{non-DL}$ is the number of all first-type time units between a transmission time unit Y-$T_{max}$ and a transmission time unit Y-$T_{min}$, here, a transmission time unit Y is a time unit for transmission of the feedback response information to be transmitted.

In an implementation, the first-type time unit includes one or any combination of: a UL time unit, a time unit in which the terminal does not transmit a physical shared channel, and a time unit in which the terminal does not monitor DL control signaling.

In an implementation, the maximum number of bits of the feedback response information corresponding to the PDSCH is: a maximum number of TBs carried in the PDSCH; or a maximum number of CB groups carried in the PDSCH.

In an implementation, the operation that the network device receives from the terminal the feedback response information to be transmitted with the total number of bits may include the following operations.

The network device receives from the terminal the feedback response information on which a joint encoding has been performed.

Or the network device receives the feedback response information that is transmitted by the terminal through a physical channel.

Figure 4:
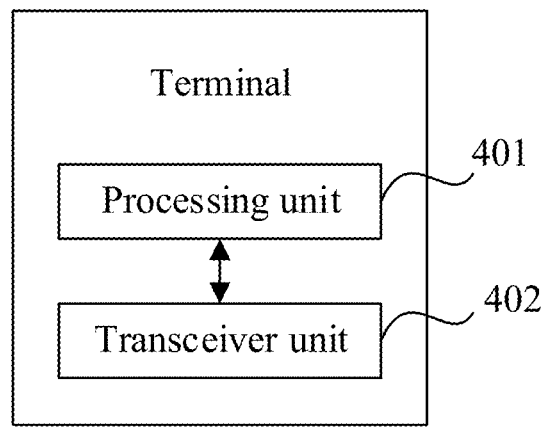
FIG. 4 is a block diagram of functional units of a terminal according to an implementation of the disclosure.

Referring to FIG. 4, FIG. 4 illustrates a device for determining a length of feedback response information. The device for determining the length of the feedback response information is configured in a terminal. Detailed solutions and technical effects in the implementation illustrated in FIG. 4 may refer to descriptions in the implementation illustrated in FIG. 3 or FIG. 3B. The terminal includes a processing unit 401 and a transceiver unit 402 connected with the processing unit 401.

The transceiver unit 402 is configured to receive configuration signaling transmitted by a network device, here, the configuration signaling includes an indication about a maximum transmission delay for feedback response information.

The processing unit 401 is configured to dynamically determine HARQ feedback timing and determine a total number of bits of feedback response information to be transmitted according to the maximum transmission delay.

The transceiver unit 402 is configured to transmit to the network device the feedback response information to be transmitted with the total number of bits.

In an implementation, the processing unit 401 is specifically configured to: determine the total number of bits of the feedback response information to be transmitted according to the maximum transmission delay and a minimum transmission delay.

In an implementation, the processing unit 401 is specifically configured to: determine the total number of bits of the feedback response information to be transmitted according to a difference between the maximum transmission delay and the minimum transmission delay.

In an implementation, the processing unit 401 is specifically configured to: determine the total number of bits of the feedback response information to be transmitted according to the maximum transmission delay, the minimum transmission delay and $M_{non-DL}$, here, $M_{non-DL}$ is a value less than the maximum transmission delay.

In an implementation, the processing unit 401 is specifically configured to: determine the total number of bits of the feedback response information to be transmitted according to a value obtained by subtracting the minimum transmission delay and $M_{non-DL}$ from the maximum transmission delay, here, $M_{non-DL}$ is a value less than the maximum transmission delay.

In an implementation, the processing unit 401 is specifically configured to determine the total number of bits of the feedback response information to be transmitted according to the maximum transmission delay, the total number of bits $N=C*(T_{max}-T_{min})$.

Here, $T_{max}$ is the maximum transmission delay, $T_{min}$ is a nonnegative integer less than $T_{max}$, and C is a positive integer.

In an implementation, the processing unit 401 is specifically configured to determine the total number of bits of the feedback response information to be transmitted according to the maximum transmission delay, the total number of bits $N=C*(T_{max}-T_{min}-M_{non-DL})$.

Here, $T_{max}$ is the maximum transmission delay, $T_{min}$ and $M_{non-DL}$ are each a nonnegative integer less than $T_{max}$, and C is a positive integer.

In an implementation, $T_{min}$ is the minimum transmission delay for transmission of feedback response information by the terminal or $T_{min}$ is a parameter configured by the network device.

In an implementation, $M_{non-DL}$ is the number of all first-type time units between a transmission time unit $Y-T_{max}$ and a transmission time unit $Y-T_{min}$, here, a transmission time unit Y is a time unit for transmission of the feedback response information to be transmitted.

The first-type time unit includes, but not limited to, one or any combination of: a UL time unit, a time unit in which no physical shared channel is transmitted by the terminal and a time unit in which no DL control signaling is monitored by the terminal.

In an implementation, C may specifically be as follows.

C may be a maximum number of bits of feedback response information corresponding to a PDSCH. Or C is a set constant. Or C is a parameter configured by the network device.

Specifically, the maximum number of bits of the feedback response information corresponding to the PDSCH may be: a maximum number of TBs carried in the PDSCH; or a maximum number of CB groups carried in the PDSCH.

In an implementation, the transceiver unit 402 is specifically configured to transmit the feedback response information on which a joint encoding has been performed.

Or the transceiver unit 402 is specifically configured to transmit the feedback response information through a physical channel.

Figure 4A:
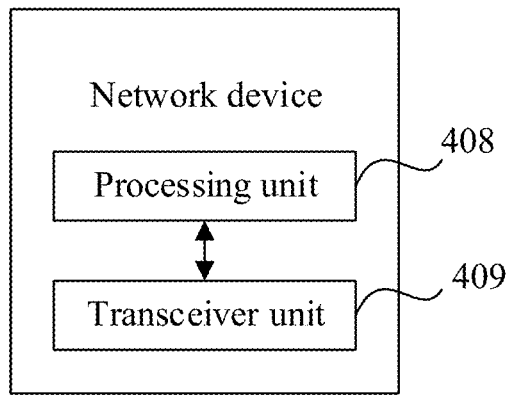
FIG. 4A is a block diagram of functional units of a network device according to an implementation of the disclosure.

Referring to FIG. 4A, FIG. 4A illustrates a network device, which includes a processing unit 408 and a transceiver 409 connected with the processing unit.

The transceiver unit 408 is configured to transmit configuration signaling to a terminal, here, the configuration signaling includes an indication about a maximum transmission delay for feedback response information.

The processing unit 409 is configured to determine HARQ feedback timing dynamically determined by the terminal and determine a total number of bits of feedback response information to be transmitted according to the maximum transmission delay.

The transceiver unit 408 is configured to receive from the terminal the feedback response information to be transmitted with the total number of bits. In the implementation illustrated in FIG. 4A, a manner for calculating the total number of bits may refer to descriptions in the implementation illustrated in FIG. 3C, and will not be elaborated herein.

Figure 5:
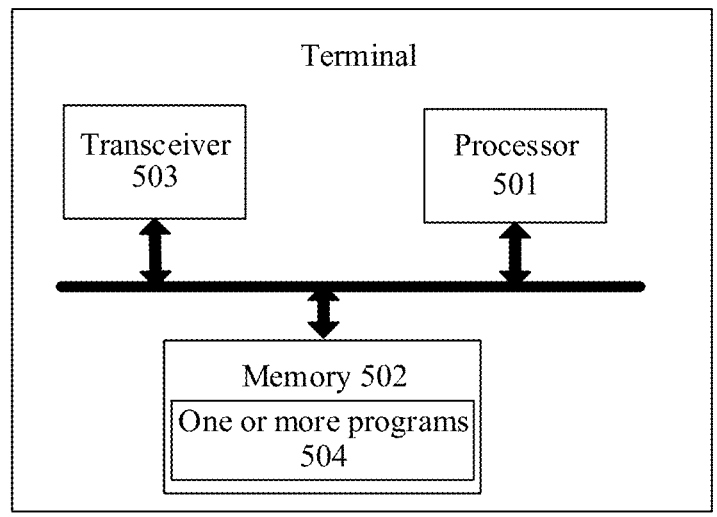
FIG. 5 is a hardware structure diagram of a terminal according to an implementation of the disclosure.

An implementation of the disclosure also provides a terminal, as illustrated in FIG. 5, includes one or more processors 501, a memory 502, a transceiver 503 and one or more programs 504. The one or more programs are stored in the memory 502 and configured to be executed by the one or more processors 501, and the programs include instructions configured to execute the operations executed by the terminal in the method provided by the implementation illustrated in FIG. 3 or FIG. 3B.

Figure 5A:
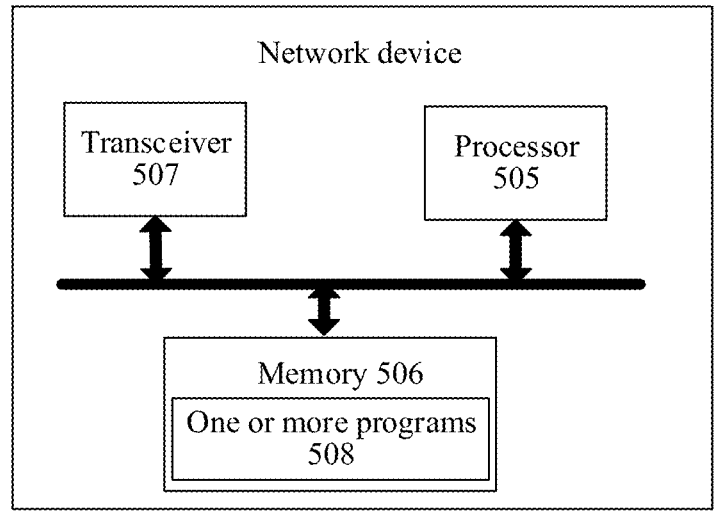
FIG. 5A is a hardware structure diagram of a network device according to an implementation of the disclosure.

An implementation of the disclosure also provides a network device, as illustrated in FIG. 5A, includes one or more processors 505, a memory 506, a transceiver 507 and one or more programs 508. The one or more programs are stored in the memory 506 and configured to be executed by the one or more processors 505, and the programs include instructions configured to execute the operations executed by the network device in the method provided by the implementation illustrated in FIG. 3C or FIG. 3B.

The processor may be a processor or a controller, for example, a Central Processing unit (CPU), a Digital Signal Processor (DSP), an Application Specific Integrated Circuit (ASIC), a Field Programmable Gate Array (FPGA) or another programmable logical device, transistor logical device, hardware component or any combination thereof. The processor may implement or execute various exemplary logical blocks, modules and circuits described in combination with the contents disclosed in the disclosure. The processor may also be a combination realizing a calculation function, for example, including a combination of one or more microprocessors and a combination of a DSP and a microprocessor. The transceiver 503 may be a communication interface or an antenna.

An implementation of the disclosure also provides a computer-readable storage medium, which stores a computer program for electronic data exchange, here, the computer program enables a computer to execute the method executed by the terminal in the implementation illustrated in FIG. 3 or FIG. 3B. Of course, the computer program enables the computer to execute the method executed by the network device in the implementation illustrated in FIG. 3C or FIG. 3B.

An implementation of the disclosure also provides a computer program product. The computer program product includes a non-transitory computer-readable storage medium storing a computer program. The computer program may be operable to enable a computer to execute the method executed by the terminal in the implementation illustrated in FIG. 3 or FIG. 3B. Of course, the computer program enables the computer to execute the method executed by the network device in the implementation illustrated in FIG. 3C or FIG. 3B.

The solutions of the implementations of the disclosure are introduced mainly from the angle of interactions between various network elements. It can be understood that for realizing the functions, the terminal and the network device include corresponding hardware structures and/or software modules executing each function. Those skilled in the art may easily realize that the units and algorithm operations of each example described in combination with the implementations disclosed in the disclosure may be implemented by hardware or a combination of the hardware and computer software in the disclosure. Whether a certain function is executed by the hardware or in a manner of driving the hardware by the computer software depends on specific applications and design constraints of the technical solutions. Professionals may realize the described functions for each specific application by use of different methods, but such realization shall fall within the scope of the disclosure.

According to the implementations of the disclosure, functional units of the terminal and the network device may be divided according to the abovementioned method examples. For example, each functional unit may be divided correspondingly for each function and two or more than two functions may also be integrated into a processing unit. The integrated unit may be implemented in a hardware form and may also be implemented in form of software program module. The division of the units in the implementation of the disclosure is schematic and only is a logical function division and another division manner may be adopted during practical implementation.

Figure 6:
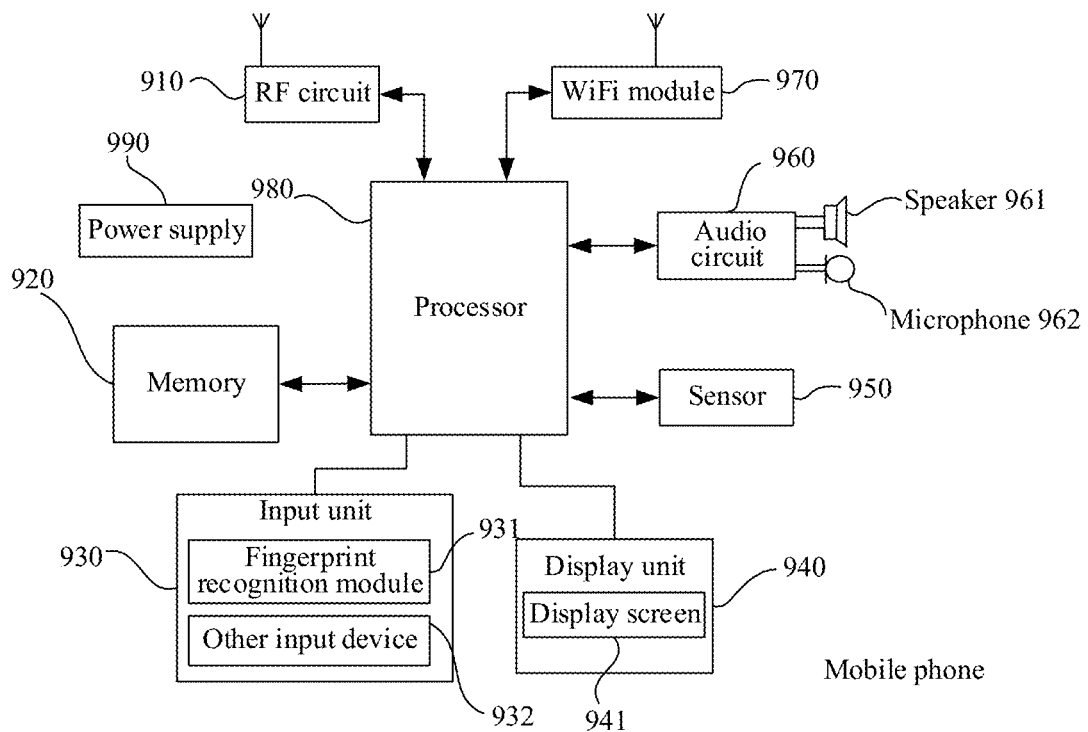
FIG. 6 is a structure diagram of another terminal according to an implementation of the disclosure.

An implementation of the disclosure also provides another terminal. As illustrated in FIG. 6, for convenient description, only parts related to the implementation of the disclosure are illustrated, and specific technical details which are undisclosed refer to parts of the method of the implementations of the disclosure. The terminal may be any terminal device including a mobile phone, a tablet computer, a Personal Digital Assistant (PDA), a Point of Sales (POS), a vehicle-mounted computer and the like. For example, the terminal is a mobile phone.

FIG. 6 is a block diagram of part structure of a mobile phone related to a terminal according to an implementation of the disclosure. Referring to FIG. 6, the mobile phone includes components such as a Radio Frequency (RF) circuit 910, a memory 920, an input unit 930, a display unit 940, a sensor 950, an audio circuit 960, a Wireless Fidelity (WiFi) module 970, a processor 980 and a power supply 990. Those skilled in the art should know that the structure of the mobile phone illustrated in FIG. 6 is not intended to limit the mobile phone and may include components more or fewer than those illustrated in the figure or some components are combined or different component arrangements are adopted.

Each component of the mobile phone will be specifically introduced below in combination with FIG. 6.

The RF circuit 910 may be configured to receive and send information. The RF circuit 910 usually includes, but not limited to, an antenna, at least one amplifier, a transceiver, a coupler, a Low Noise Amplifier (LNA), a duplexer and the like. In addition, the RF circuit 910 may also communicate with a network and another device through wireless communication. Any communication standard or protocol may be adopted for wireless communication, including, but not limited to, a Global System of Mobile communication (GSM), a General Packet Radio Service (GPRS), Code Division Multiple Access (CDMA), Wideband Code Division Multiple Access (WCDMA), Long Term Evolution (LTE), an electronic mail, Short Messaging Service (SMS) and the like.

The memory 920 may be configured to store a software program and a module. The processor 980 runs the software program and module stored in the memory 920, thereby executing various function applications and data processing of the mobile phone. The memory 920 may mainly include a program storage region and a data storage region. The program storage region may store an operating system, an application program required by at least one function and the like. The data storage region may store data created according to use of the mobile phone and the like. In addition, the memory 920 may include a high-speed Random Access Memory (RAM) and may further include a nonvolatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include a fingerprint recognition module 931 and other input device 932. The fingerprint recognition module 931 may acquire fingerprint data of a user thereon. In addition to the fingerprint recognition module 931, the input unit 930 may further include the other input device 932. Specifically, the other input device 932 may include, but not limited to, one or more of: a touch screen, a physical keyboard, a function key (for example, a volume control button and a switch button), a trackball, a mouse, a stick and the like.

The display unit 940 may be configured to display information input by the user or information provided for the user and various menus of the mobile phone. The display unit 940 may include a display screen 941. In an implementation, the display screen 941 may be configured in form of Liquid Crystal Display (LCD) and Organic Light-Emitting Diode (OLED). In FIG. 6, the fingerprint recognition module 931 and the display screen 941 realize input and output functions of the mobile phone as two independent components. However, in some implementations, the fingerprint recognition module 931 and the display screen 941 may be integrated to realize the input and play functions of the mobile phone.

The mobile phone may further include at least one sensor 950, for example, a light sensor, a motion sensor and another sensor. Specifically, the light sensor may include an environmental light sensor and a proximity sensor. The environmental light sensor may regulate brightness of the display screen 941 according to brightness of environmental light, and the proximity sensor may turn off the display screen 941 and/or backlight when the mobile phone is moved to an ear. An accelerometer sensor as a motion sensor may detect a magnitude of an acceleration in each direction (usually three axes), may detect a magnitude and direction of the gravity under a static condition, and may be configured for an application recognizing a posture of the mobile phone (for example, landscape and portrait switching, a related game and magnetometer posture calibration), a function related to vibration recognition and the like (for example, a pedometer and knocking). Other sensors, for example, a gyroscope, a barometer, a hygrometer, a thermometer and an infrared sensor, which may be configured in the mobile phone will not be elaborated herein.

The audio circuit 960, a speaker 961, and a microphone 962 may provide audio interfaces between the user and the mobile phone. The audio circuit 960 may transmit to the speaker 961 an electric signal obtained by converting received audio data, and the speaker 961 converts the electric signal into a sound signal for playing. On the other hand, the microphone 962 converts a collected sound signal into an electric signal, the audio circuit 960 receives and converts the electric signal into audio data, and the audio data is processed by the processor 980 and transmitted to, for example, another mobile phone through the RF circuit 910, or the audio data is played to the memory 920 for further processing.

WiFi is a short-distance wireless transmission technology. The mobile phone may help the user through the WiFi module 970 to receive and send an electronic mail, browse a webpage, access streaming media and the like, and wireless wideband Internet access is provided for the user.

Although the WiFi module 970 is illustrated in FIG. 6, it can be understood that it is not a necessary composition of the mobile phone and may completely be omitted according to a requirement without changing the scope of the essence of the disclosure.

The processor 980 is a control center of the mobile phone, connects each part of the whole mobile phone by use of various interfaces and lines and executes various functions and data processing of the mobile phone by running or executing the software program and/or module stored in the memory 920 and calling data stored in the memory 920, thereby monitoring the whole mobile phone. In an implementation, the processor 980 may include one or more processing units. The processor 980 may integrate an application processor and a modulation and demodulation processor. The application processor mainly processes the operating system, a user interface, an application program and the like. The modulation and demodulation processor mainly processes wireless communication. It can be understood that the modulation and demodulation processor may also not be integrated into the processor 980.

The mobile phone further includes the power supply 990 (e.g., battery) supplying power to each part. The power supply may be logically connected with the processor 980 through a power management system, thereby realizing functions of charging and discharging management, power consumption management and the like through the power management system.

Although not illustrated in the figure, the mobile phone may further include a camera, a Bluetooth module and the like, which will not be elaborated herein.

In the implementation illustrated in FIG. 3 or FIG. 3B, the flow on a terminal side in each operation of the method may be implemented on the basis of the structure of the mobile phone.

In the implementation illustrated in FIG. 4 or FIG. 5, each functional unit may be implemented on the basis of the structure of the mobile phone.

The operations of the method or algorithm described in the implementations of the disclosure may be implemented in a hardware manner, and may also be implemented in a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that in one or more abovementioned examples, all or part of the functions described in the implementations of the disclosure may be realized through software, hardware or any combination thereof. During implementation with the software, the implementations may be implemented completely or partially in form of computer program product. The computer program product includes one or more computer instructions. When the computer program instruction is loaded and executed on a computer, the flows or functions according to the implementations of the disclosure are completely or partially generated. The computer may be a universal computer, a dedicated computer, a computer network or another programmable device. The computer instruction may be stored in a computer-readable storage medium or transmitted from a computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or may be a data storage device including such as a server and a data center integrated by one or more available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementation modes further describe the purposes, technical solutions and beneficial effects of the implementations of the disclosure in detail. It is to be understood that the above is only the specific implementation mode of the implementations of the disclosure and not intended to limit the scope of protection of the implementations of the disclosure. Any modifications, equivalent replacements, improvements and the like made on the basis of the technical solutions of the implementations of the disclosure shall fall within the scope of protection of the implementations of the disclosure.

The invention claimed is:

1. A method for determining feedback response information, comprising:
   determining, by a terminal, the feedback response information transmitted in a third time unit, according to a first time unit, a second time unit and a number of first-type time units; and
   transmitting, by the terminal, the feedback response information to a network device in the third time unit,
   wherein a sum of an index of the first time unit and a number of time units corresponding to a maximum transmission delay is equal to an index of the third time unit, a sum of an index of the second time unit and a number of time units corresponding to a minimum transmission delay is equal to the index of the third time unit, and the first-type time unit is a time unit, not used for physical downlink shared channel (PDSCH) transmission, between the first time unit and the second time unit,
   wherein the feedback response information excludes a bit corresponding to the first-type time unit.

2. The method of claim 1, wherein the index of the third time unit is equal to a sum of an index of a time unit in which feedback timing indication information is transmitted and a feedback timing value indicated by the feedback timing indication information.

3. The method of claim 1, wherein the first time unit, the second time unit and the third time unit are all slots.

4. The method of claim 1, wherein the maximum transmission delay is a maximum time interval between a time unit in which downlink data is transmitted and a time unit in which feedback response information for the downlink data is transmitted, and the minimum transmission delay is a minimum time interval between a time unit in which downlink data is transmitted and a time unit in which feedback response information for the downlink data is transmitted.

5. A terminal, comprising:
a transceiver;
a processor; and
a memory, configured to store one or more program instructions that, when executed by the processor, cause the processor to determine feedback response information transmitted in a third time unit, according to a first time unit, a second time unit and a number of first-type time units; and transmit, through the transceiver, the feedback response information to a network device in the third time unit,
wherein a sum of an index of the first time unit and a number of time units corresponding to a maximum transmission delay is equal to an index of the third time unit, a sum of an index of the second time unit and a number of time units corresponding to a minimum transmission delay is equal to the index of the third time unit, and the first-type time unit is a time unit, not used for physical downlink shared channel (PDSCH) transmission, between the first time unit and the second time unit,
wherein the feedback response information excludes a bit corresponding to the first-type time unit.

6. The terminal of claim 5, wherein the index of the third time unit is a sum of an index of a time unit in which feedback timing indication information is transmitted and a feedback timing value indicated by the feedback timing indication information.

7. The terminal of claim 5, wherein the first time unit, the second time unit and the third time unit are all slots.

8. The terminal of claim 5, wherein the maximum transmission delay is a maximum time interval between a time unit in which downlink data is transmitted and a time unit in which feedback response information for the downlink data is transmitted, and the minimum transmission delay is a minimum time interval between a time unit in which downlink data is transmitted and a time unit in which feedback response information for the downlink data is transmitted.

9. A network device, comprising:
a transceiver;
a processor; and
a memory, configured to store one or more program instructions that, when executed by the processor, cause the processor to receive, through the transceiver, feedback response information from a terminal in a third time unit,
wherein the feedback response information is determined according to a first time unit, a second time unit and a number of first-type time units,
wherein a sum of an index of the first time unit and a number of time units corresponding to a maximum transmission delay is equal to an index of the third time unit, a sum of an index of the second time unit and a number of time units corresponding to a minimum transmission delay is equal to the index of the third time unit, and the first-type time unit is a time unit, not used for physical downlink shared channel (PDSCH) transmission, between the first time unit and the second time unit,
wherein the feedback response information excludes a bit corresponding to the first-type time unit.

10. The network device of claim 9, wherein the index of the third time unit is equal to a sum of an index of a time unit in which feedback timing indication information is transmitted and a feedback timing value indicated by the feedback timing indication information.

11. The network device of claim 9, wherein the first time unit, the second time unit and the third time unit are all slots.

12. The network device of claim 9, wherein the maximum transmission delay is a maximum time interval between a time unit in which downlink data is transmitted and a time unit in which feedback response information for the downlink data is transmitted, and the minimum transmission delay is a minimum time interval between a time unit in which downlink data is transmitted and a time unit in which feedback response information for the downlink data is transmitted.

* * * * *